United States Patent [19]

King et al.

[11] Patent Number: 5,033,363
[45] Date of Patent: Jul. 23, 1991

[54] APPARATUS FOR POPPING POPCORN

[75] Inventors: Michael H. King, Scottsburg, Ind.;
Donald J. Porada, Fairfield, Ohio;
Lee W. Poppe, Jr., Louisville, Ky.

[73] Assignee: National Icee Corporation,
Philadephia, Pa.

[21] Appl. No.: 449,017

[22] Filed: Dec. 11, 1989

[51] Int. Cl.[5] .................................................. A23L 1/18
[52] U.S. Cl. .................................. 99/323.7; 99/323.9;
426/233; 426/450
[58] Field of Search .................. 99/323.4, 323.5, 323.6,
99/323.7, 323.8, 323.9, 486, 488, 493; 426/450,
233

[56] References Cited

U.S. PATENT DOCUMENTS

| | | |
|---|---|---|
| 2,848,937 | 8/1958 | Martin ................................ 99/323.7 |
| 3,120,168 | 2/1964 | Lippert . |
| 3,294,546 | 12/1966 | Fingerhut . |
| 3,512,989 | 5/1970 | Smith . |
| 3,606,828 | 9/1971 | Smith . |
| 4,182,229 | 1/1980 | VandeWalker . |
| 4,307,657 | 12/1981 | Avery . |
| 4,438,682 | 3/1984 | King et al. . |
| 4,494,314 | 1/1985 | Gell ...................................... 99/323.7 |
| 4,582,713 | 4/1986 | Hirokawa ............................. 426/233 |

Primary Examiner—Robert W. Jenkins
Attorney, Agent, or Firm—Panitch, Schwarze, Jacobs & Nadel

[57] ABSTRACT

An automatic, hot air corn popping machine has a feed conveyor to transport unpopped corn from a reservoir to the base of a popping tube forming part of the popping chamber, a damper-controlled blower and a thermostatically-controlled heater to heat and blow air to pop corn in the popping chamber. A control circuit is provided with a reprogrammable microcomputer which permits independent variation by digital incrementation of various operating parameters of the machine over continuous ranges to permit rapid, convenience and accurate adjustment of the machine, even while the machine operates, to configure the machine for optimal popcorn production at any selected production rate and to compensate for variations in popping chambers and in the nominal levels of local line voltages occurring in different locations.

20 Claims, 16 Drawing Sheets

APPARATUS FOR POPPING POPCORN

BACKGROUND OF THE INVENTION

This invention relates to a machine for the commercial preparation of popcorn generally similar to those disclosed in U.S. Pat. Nos. 3,294,546 and 4,438,682, and particularly to a popcorn machine that is adapted to produce popcorn of the highest quality on a commercial volume basis with the least wastage.

U.S. Pat. No. 3,294,546 describes a commercial hot air popcorn machine which used a popping tube within a glass, domed popping jar for visible hot air popping of corn. Heated air was used to support a fluid bed of unpopped kernels of corn at the base of the popping tube. Popped kernels were carried by the heated air up and out of the tube and down between the tube and the jar to a collection tray beneath a lower open end of the jar. A first thermostatic switch was provided to control the feeding of unpopped corn kernels into a popping chamber at the base of the popping tube when the temperature of the chamber rose above a preset value of the switch. A feed conveyor auger was activated by the switch to feed corn into the popping chamber until the chamber temperature dropped below the cutoff value of the switch. Second and third thermostatic switches were provided to shut off three of five separate heater elements provided for air heating in the event that temperatures in the popping chamber or in the heater itself rose above predetermined values. The remaining two heater elements were manually controlled by a production switch. In this device, gross regulation of the popping chamber temperature was accomplished by the thermostatic and manual switches. Fine regulation of the popping chamber temperature was accomplished by feeding corn into the chamber to absorb heat and lower the temperature. Unfortunately, it took several consecutive initial popping cycles before equilibrium conditions and optimum operation of the machine would be reached (see Col. 13, lines 60-65). Moreover, because of the difficulty in accurately adjusting the thermostatic switch controlling the corn feed conveyor and because the popping chamber temperature was not directly controlled by continual set point adjustment of the heaters, the popping chamber temperature would tend to fluctuate over relatively broad ranges during the course of a popping cycle and result in significant wastage (percentage of unpopped kernels).

U.S. Pat. No. 4,438,682 discloses an improved commercial, glass domed popcorn popping machine including a manually-operable selector switch adapted to be set at any of four positions for selecting any of four rates of popping corn. This machine was designed for timed cyclic operation. The selector switch controlled electrical circuitry which in turn controlled the operation of a corn feed conveyor at different duty factors for feeding corn at different preselected rates. The selector switch further controlled the degree to which a damper, which regulated hot air flow through the popping chamber, opened and when it closed. The selector switch further controlled the number of individual heating elements which were energized during the cycle with an additional element being energized during each incremental advance of the switch. In addition, a trim heater was provided which was cycled on and off by a temperature controller. Thus, by mere switch change, the machine could be configured to operate at the highest popping rate during periods of peak demand and could be adjusted to operate at one of three other discrete reduced popping rates as demand required. The machine could operate at at least a minimal rate, even when demand was very low, in order to continue to attract customers and potential customers with freshly popped corn.

Machines based upon the aforesaid U.S. Pat. No. 4,438,682 included a control system with discrete, integrated circuits and a temperature controller. The latter employed an air temperature probe located in the popping chamber and included a plurality of manually adjustable potentiometers. The potentiometers could be set to output a first signal when popping chamber air temperature reached a minimum temperature at which the conveyor was enabled to feed corn, a second signal when the popping chamber air temperature reached a higher, desired popping or "cycle" temperature to cycle the trim heater and a third signal when the popping chamber air temperature reached a maximum allowable temperature to shut down the heaters and disable the conveyor. Other adjustable potentiometers were provided elsewhere in the control system to permit selection of other operating parameters such as the damper position, corn feed rates, etc. However, at least the potentiometers which were provided for adjustably setting corn feed cycle and damper settings were adjusted once during circuit assembly to preselected output levels and then potted to prevent changes in those settings. When finally installed in popping machines, these circuits were essentially hard wired and no longer adjustable. Salt and oil feed rates and popping chamber "cycle" temperature setting potentiometers were left adjustable.

In operation, it was found that the machines based on the design disclosed in U.S. Pat. No. 4,438,682 could be further improved. The discrete integrated circuit control system, the blower and the heaters employed in that machine were noticeably affected by the differences in nominal line voltage which occur from location to location around the country. It was also found that there were subtle variations in popping chambers from machine to machine which also affected the time, temperature and air flow parameters required for optimal performance. These fluctuations and variations affected the ability of the machine to operate efficiently in a predictable and repeatable manner in all environments. The actual performance of a machine at any particular location in the country could not be known until the machine was installed and operated. While the machine could be operated at four different output levels, it could not be easily adjusted or ever fully adjusted for optimal performance at any output level. Even if they could have been adjusted, there was no easy or convenient way to measure or otherwise determine important operating parameters of the machine because certain parameters varied with variations in the line voltage. Nor was there any way to predictably adjust in the field any of the parameters which could be adjusted, such as popping chamber temperature, for example. There was no easy or convenient way to measure or otherwise determine popping chamber temperature. As a result, machines built according to the aforesaid U.S. Pat. No. 4,438,682 averaged about 8% wastage in use. These inefficiencies were not known and could not be appreciated until several of the machines were built and operated under different conditions in different areas in the country.

SUMMARY OF THE INVENTION

In one aspect, the invention is a corn popping machine comprising: a reservoir for unpopped corn; a popping tube forming at least part of a popping chamber; feed conveyor means for transporting unpopped corn from the reservoir to the popping chamber; heater means for heating air; air-flow conveying means coupling the heater means and the popping chamber for moving air at a variable glow rate through the heater means to the popping chamber; and control circuit means for controlling the operation of at least the feed conveyor means and the air-flow conveying means. The control circuit means is adjustable for varying an amount of corn transported by the feed conveyor means during a predetermined period of time, and for varying flow rate of the air delivered to the heater means independently of one another.

In another aspect, the invention is a corn popping machine comprising: a reservoir for unpopped corn; a popping tube forming at least part of a popping chamber; feed conveyor means for transporting unpopped corn from the reservoir to the popping chamber; heater means for heating air; air-flow conveying means coupling the heater means and the popping chamber for moving air through the heater means to the popping chamber; sensor means in the popping chamber for sensing temperature of air therein; and programmable computer means with an operating program for at least partially controlling corn popping operation of the machine.

In another aspect, the invention is a corn popping machine comprising: a reservoir for unpopped corn; a popping tube forming at least part of a popping chamber; feed conveyor means for transporting unpopped corn from the reservoir to the popping chamber; sensor means in the popping chamber for sensing temperature of air therein; heater means for heating air; air-flow conveying means coupling the heater means and the popping chamber for moving air through the heater means to the popping chamber; display means for displaying temperature; and control circuit means for controlling at least one operation of the machine and for displaying temperature of air in the popping chamber sensed by the sensor means on the display means.

In another aspect, the invention is a corn popping machine comprising: a reservoir for unpopped corn; a popping tube forming at least part of a popping chamber; feed conveyor means for transporting unpopped corn from the reservoir to the popping chamber; heater means for heating air; a storage area adapted to receive popped corn from the popping chamber; air-flow conveying means coupling the heater means and the popping chamber for moving air through the heater means to the popping chamber and for moving popped corn from the popping chamber to the storage area; and sensor means for sensing when the storage area is filled to a predetermined extent with popped corn.

In another aspect, the invention is a method of operating a corn popping machine including a reservoir for unpopped corn, a popping tube forming at least part of a popping chamber, a feed conveyor transporting unpopped corn from the reservoir to the popping chamber, a heater, an air-flow conveying system coupling the heater and the popping chamber for moving air at a variable flow rate through the heater to the popping chamber, and a control circuit controlling operation of at least the feed conveyor and the air-flow conveying system. The control circuit is further adjustable for varying an amount of corn transported by the feed conveyor during a predetermined period of time and for varying the flow rate of air delivered to the heater independently of one another. This aspect of the invention comprises the steps of operating the machine to pop corn; adjusting the control circuit to vary at least one of the amount of corn transported during a predetermined period of time and the flow rate of air delivered to the heater independently of the remaining one; and operating the machine with the adjusted control circuit to pop corn.

DETAILED DESCRIPTION OF THE PREFERRED EMBODIMENT

The preferred embodiment is based upon improvements over the popcorn machine disclosed in U.S. Pat. No. 4,438,682, which is incorporated in its entirety by reference herein. Both the machine of that patent and the preferred embodiment hereinafter described are generally related in principle and operation to the popcorn machine originally disclosed in U.S. Pat. No. 3,294,546, which is also incorporated in its entirety by reference herein.

Figure 1:
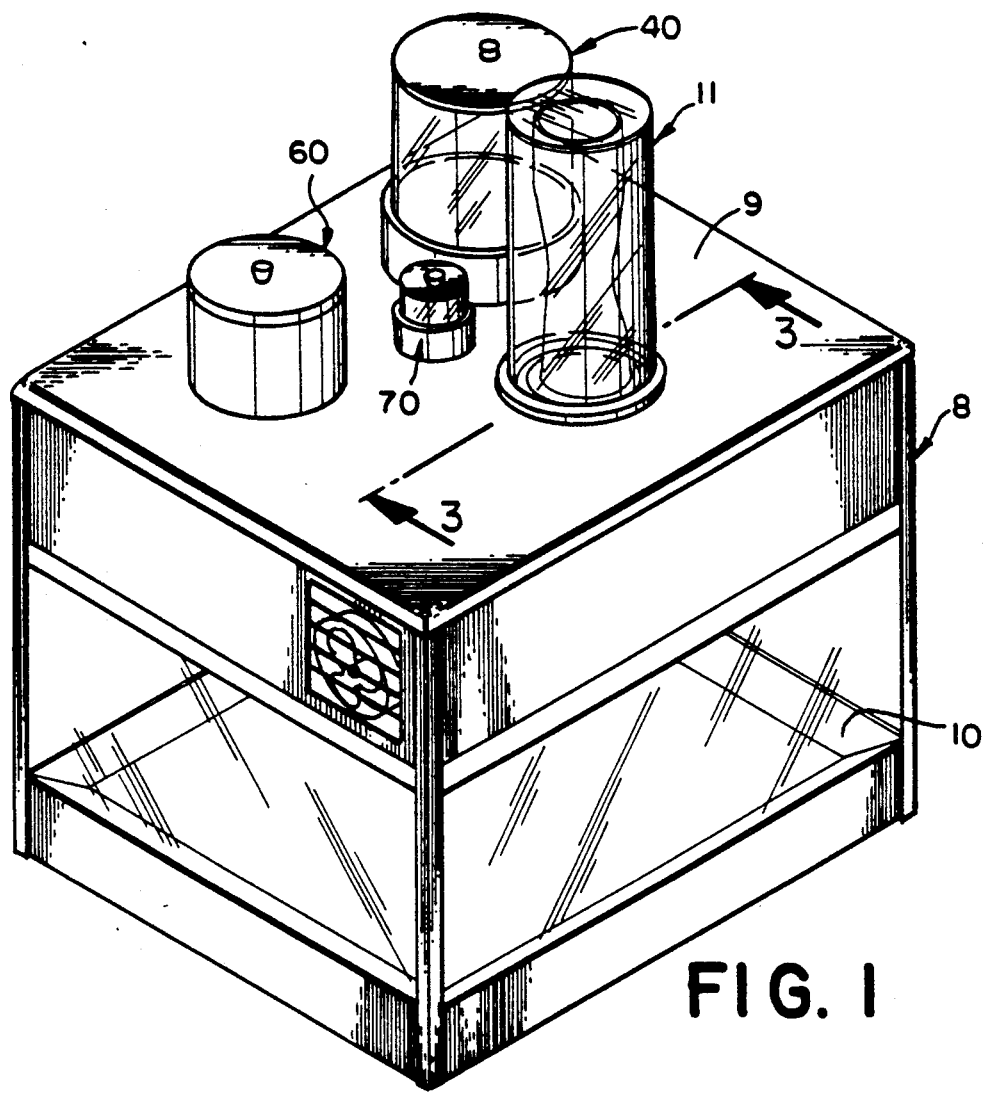
FIG. 1 is a perspective illustration of a corn popping machine according to the present invention.
Figure 2:
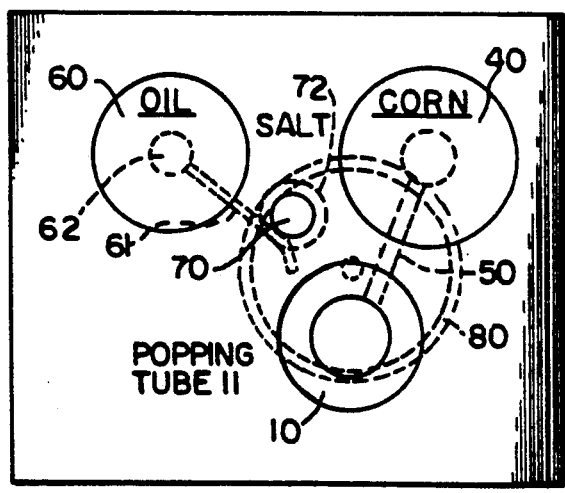
FIG. 2 is a plan view of the machine of FIG. 1.

In FIGS. 1 and 2, there is shown a corn popping machine comprising a rectangular housing or cabinet 8 having a top cover 9. Projecting upwardly from cover 9 are a transparent popping jar 11, a reservoir 40 for unpopped corn, a seasoning oil supply 60, and a salt supply 70. Located within the popping jar 11 is a popping tube 12 which extends upwardly through the top cover 9, within the jar 11, to slightly below the dome of the jar 11. The space between the upper edge of the popping tube 12 and the dome of the jar 11 is sufficient to allow the popped corn to pass over the edge of the tube 12 and down between the tube 12 and jar 11. The jar 11 may be, for example, about seventeen inches tall and the popping tube 12 may be sixteen-and-one-quarter inches tall to provide about a three-quarter inch space therebetween. The lower portion of the cabinet 8 is preferably enclosed in transparent panels and forms a storage area 10 for the popped corn. An intermediate, horizontal panel 9', seen in FIGS. 3 and 4, separates an upper portion of the machine housing the electrical and mechanical components from the storage area 10.

Figure 3:
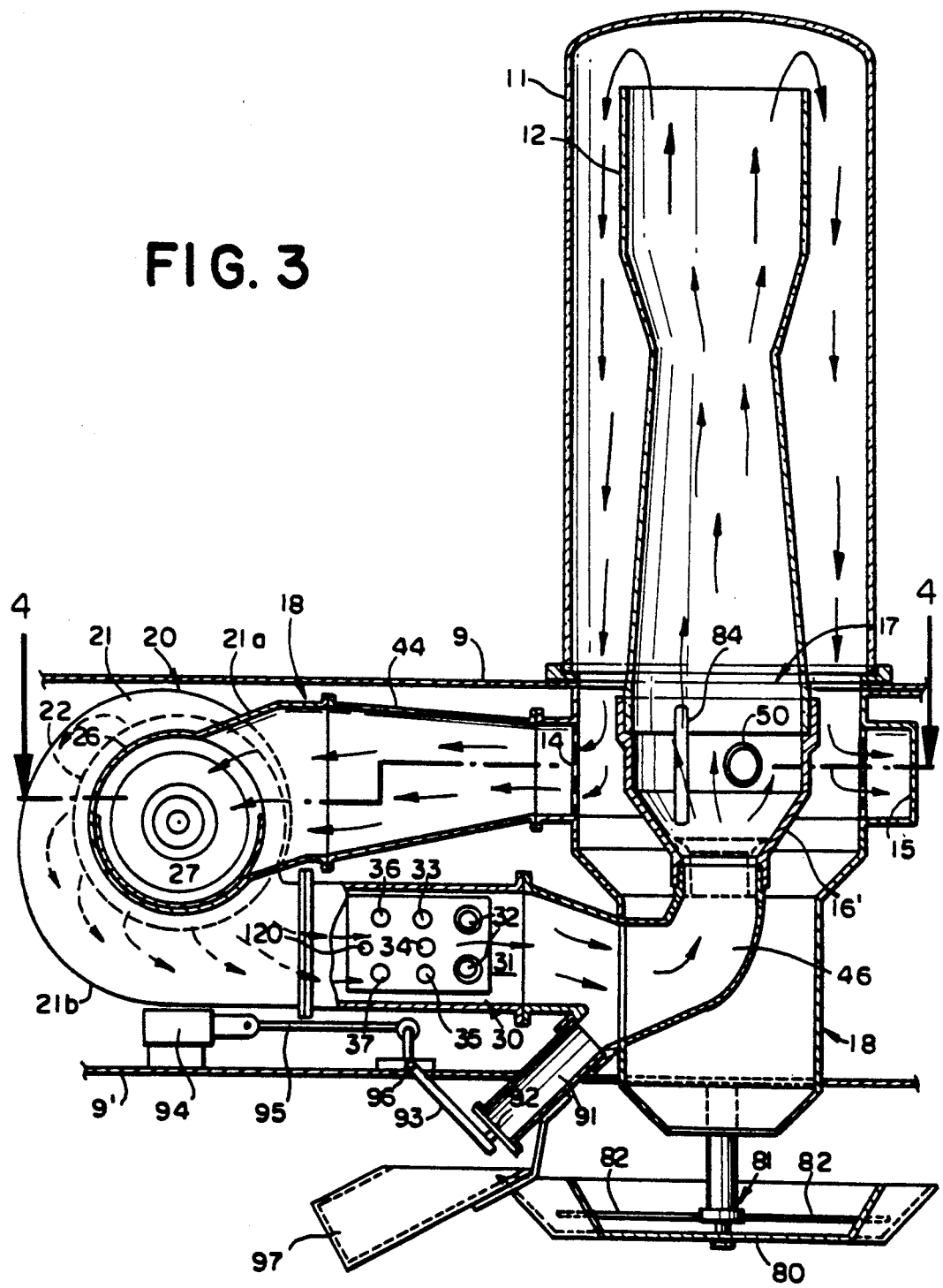
FIG. 3 is an elevational view, in section, looking along the line 3—3 of FIG. 1.
Figure 4:
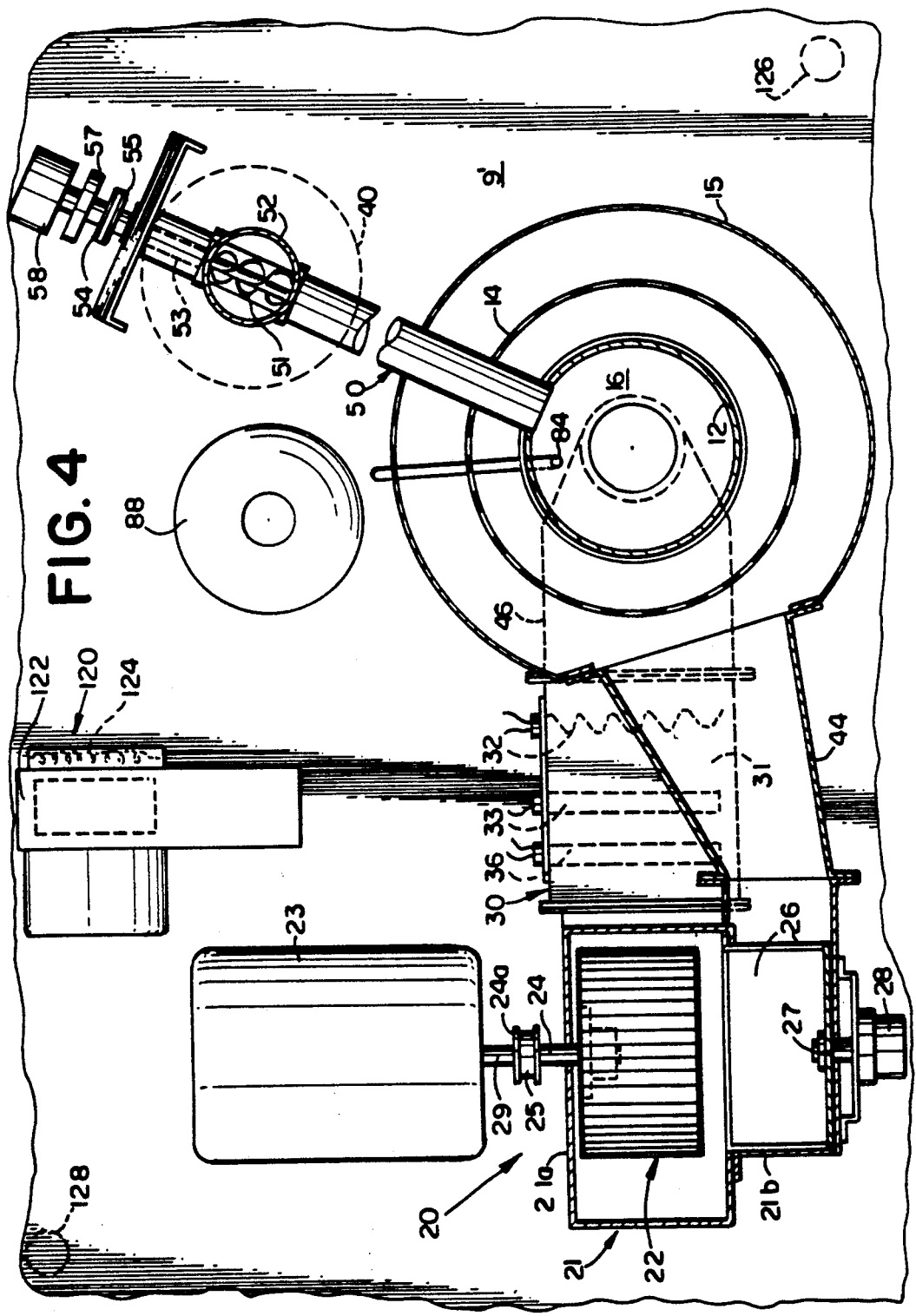
FIG. 4 is a view, in section, looking down along the line 4—4 of FIG. 3.

FIG. 4 shows the feed conveyor 50 beneath the corn reservoir 40 and between the top cover 9 and intermediate panel 9'. The reservoir 40 tapers at its lower end from its original diameter above the top surface 9 to a smaller diameter sufficient to be received within and supported by stub tube 52 which projects upwardly from the main tubular wall of the feed conveyor 50 and functions as the inlet to the feed conveyor. Within the feed conveyor 50 is an auger 51 which is driven rotationally and which functions as a feed screw. The auger 51 is connected to a drive shaft 53 which is connected to first pulley 54 of a belt-and-pulley drive, further comprising a second pulley (not seen) and a belt 55 coupling the pulleys, a gear reduction unit 57, and a drive motor 58, which is preferably of the synchronous type. A stepper type motor could also be used. Referring to FIG. 3, when the motor 58 is operated, the conveyor 50 transports unpopped corn from reservoir 40 to an opening through a necked member 16 supporting and forming with the popping tube 12 a popping chamber indicated generally at 17. The amount of corn transported during a predetermined period of time is controlled in this embodiment by intermittently operating the motor 58 to vary the duty factor of the conveyor for the period.

As shown in FIGS. 3 and 4, a heater 30 includes a heating chamber 31 provided with a plurality of heater elements, preferably six elements 32 through 37, for heating air to pop the corn. The heating chamber 31 with heater elements 32 through 37, popping tube 12 and popping jar 11 are coupled together by an air-flow conveying system indicated generally at 19, which preferably comprises a blower, which is indicated generally at 20, in a housing 21 having an inlet chamber 21a coupled to the lower end of popping jar 11 by a return conduit 44 and a cylindrical portion 15 of an internal housing 18, and an outlet chamber 21b coupled directly to one side of the heater 30. The system 19 further includes a second conduit 46 coupling a remaining opposing side of the heater 30 with the necked member 16 and the open bottom end of the popping tube 12, which is supported generally centered within the popping jar 11 by the necked member 16. The internal housing 18 extends downwardly from the lower open end of popping jar 11 to just above a seasoning tray 80.

The blower 20 preferably includes a squirrel cage-type impeller 22 driven by a blower motor 23 which is connected to the impeller 22 by first pulley 24a on impeller shaft 24, a second pulley (hidden below pulley 24a in FIG. 4) on motor shaft 29 and a drive belt 25 coupling the pulleys. Air from the blower 20 is driven through the heating chamber 31 which preferably contains a resistance wire cycle heater 32, preferably rated at at least two thousand watts, and a set of five cartridge-type heater rods 33–37, preferably each rated at at least five hundred watts. The air-flow conveying system moves air, which is heated by the plurality of heater elements 32–37, in the direction of the unnumbered arrows in FIG. 3 through conduit 46 upwardly through popping chamber 17 and down the popping jar 11 where it passes through screening 14 into the cylindrical portion 15 of the internal housing 18 coupled to the return conduit 44.

Referring to FIG. 4, unpopped corn from corn reservoir 40 falls down into the stub tube 52 of feed conveyor 50 and is carried by the auger 51 to the necked member 16 at the base of the popping tube 12 (not depicted). As seen in FIG. 3, corn is delivered through the necked member 16 below the base of the popping tube 12 and is blown upwardly into the tube 12 by the hot air being delivered from blower 20 through heating chamber 31. The unpopped corn is supported in a fluid bed (not depicted) in the chamber 17 by the column of heated air being delivered through conduit 46 and the base of the necked member 16 by the air-flow conveying system 19. The corn supported in the fluid bed in the chamber 17 will pop when it reaches popping temperature (approximately 390° F.). The unpopped corn, having a lower density than the unpopped kernels, are blown upwardly and outwardly over the upper rim of tube 12 and down between the transparent popping jar 11 and the popping tube 12 along the internal housing 18 which directs the popped corn onto the seasoning tray 80.

It has been found that efficient corn popping is closely related to the interaction of popping chamber air temperature, air-flow rate and corn feed rate. The temperature of the hot air which is delivered by heater 30 through conduit 46 to the popping chamber 17 is controlled by controlling the number of heater rods 33–37 which are activated and by intermittently operating the resistance wire cycle heater 32. It is further affected by the rate of air flow through the heater 30. The flow rate at which air is delivered from the blower to the heater 30 is controlled by an adjustable damper mechanism (see FIGS. 3 and 4) of the air-conveying system which comprises an arcuate plate 26 of semicircular shape mounted on shaft 27 of a reversible damper motor 28. In FIG. 3, the semicircular plate 26 is illustrated in a position in which the communication between the return conduit 44 and the inlet chamber 21a to the blower 20 is half-closed/half-open. It will be seen that by rotating plate 26 counterclockwise or clockwise, the opening may be further closed or opened. As will be described later, the position of plate 26 is adjusted by motor 28 in response to signals, which are generated by a microprocessor 110 forming part of a control circuit 98 partially depicted in block diagram form in FIG. 5, to controllably vary and determine the flow rate of air delivered from the blower to the heater 30 for passing through the popping tube and jar. At lower corn production rates, it may be desirable to reduce the air-flow rate through the popping tube 12 by closing the damper sufficiently so that some unpopped kernels may pass through the throat at the bottom of the necked member 16. In that case, it is possible to maintain air-flow rates at the throat of the necked member 16 sufficiently high to prevent loss of unpopped corn by inserting a tubular insert 16', (indicated in phantom in FIG. 3) to reduce the throat area and thereby increase the air-flow rate through the throat.

By means illustrated diagrammatically in FIG. 2 but not shown or described in detail, since such mechanisms are known, seasoning oil from the supply 60 is delivered through a tube 61 to seasoning tray 80 by operation of a solenoid 62, and salt from salt supply 70 is delivered via a preferably reversible motor 72 (FIG. 5) to seasoning tray 80. The solenoid may be configured to open a closed valve (not depicted) when actuated or release a closed self-opening valve (not depicted) when deactivated. Referring back to FIG. 3, a spider 81 preferably including a pair of radial arms 82 is rotated within the tray 80 to stir and mix up the popped corn so that it is seasoned by the oil and by the salt. The rate of rotation of the spider 81 may be, for example, about twenty-five to thirty r.p.m.

In FIG. 3, a mechanism, identified generally by the reference numeral 90, is provided to dispose of corn which fails to pop. Conduit 46 is provided with a short discharge chute 91 whose end is normally closed by a flapper or door 92. Unpopped corn falls down into chute 91 and accumulates there. To empty chute 91, a solenoid 94 is deactivated to permit door 92 to swing open and allow the accumulated unpopped corn to fall down into receptacle 97. When activated again, solenoid 94 closes door 92 through linkage 93, 95 and 96.

Referring to FIG. 4, a number of other elements in the machine are shown. First, temperature sensor means in the form of a popping chamber air temperature sensing probe 84 is preferably provided extending into the popping chamber 17 through the necked member 16 and into the heated air being carried by the conduit 46 to the base of the popping tube 12. The probe 84 senses the temperature of air in the popping chamber 17. The probe 84 provides a means for controlling the heating operation of the machine through fine adjustment of the popping chamber air temperature and for real-time measurement and display of popping chamber air temperature, as will be described. Referring to FIG. 3, also preferably mounted above aluminum support plate 9' are a cabinet light indicated diagrammatically at 88 for illuminating the popcorn storage area 10 and a cabinet warmer 120 including a blower 122 incorporating a heater element 124 (in phantom) at the inlet of the blower 122. Other lights which may be provided in a conventional fashion and controlled in the same way but not depicted in the figures include a spotlight illuminating the popping jar 11, and, if desired, light(s) backlighting one or more translucent panels covering one or more sides of the upper portion of the cabinet 8.

Also shown in phantom in FIG. 3 are an electric eye source 126 and an electric eye sensor 128 which are mounted beneath the support plate 9' within the lower portion 10 of the cabinet 8. The light source and sensor 126 and 128 are positioned so that the light beam from the source 126 passes over the outlet of the internal housing 18 above the seasoning tray 80. If the beam were broken for any significant length of time, for example, a few seconds, it would indicate the filling of the lower portion 10 of the cabinet with standing, popped corn or the clogging of the outlet of the internal housing 18 and/or the seasoning tray 80.

Referring to FIG. 1, a cabinet cooling fan 86 is provided to force ambient air into the enclosed upper portion of the cabinet 8 between the top cover 9 and intermediate plate 9' for cooling of the electrical and electronic components in that portion of the cabinet. One or a pair of louvered doors (not depicted) are provided on the hidden rear side of the cabinet 8, adjoining the side mounting the fan 86 in FIG. 1, to exhaust the cooling air and to permit access into the upper portion of the cabinet 8 housing the various mechanical and electrical components of the machine.

Figure 5:
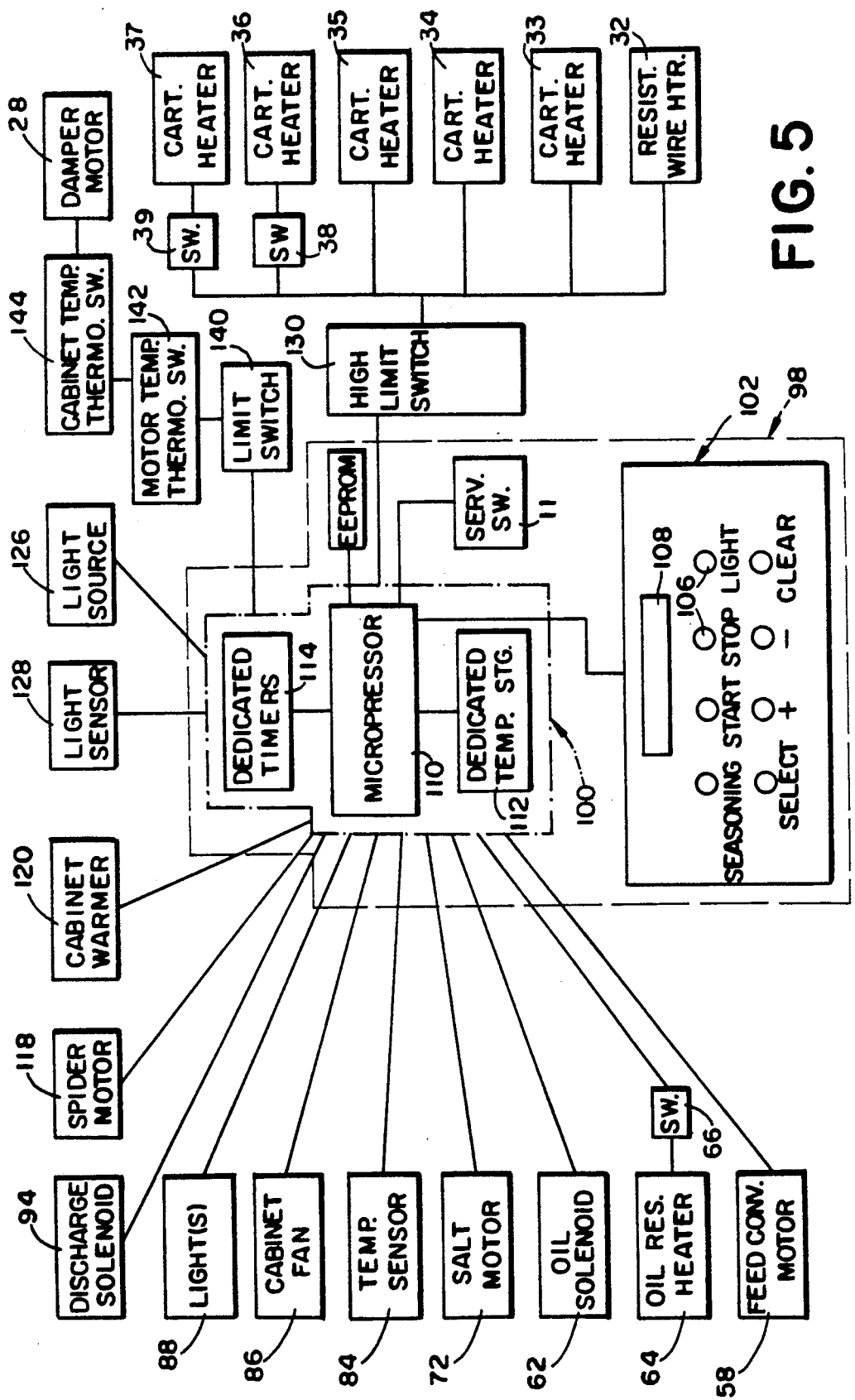
FIG. 5 is a block diagram of the control circuit and the various electrical and electromechanical machine elements controlled by and through the control circuit.

FIG. 5 depicts in block diagram the form of the major components of the control circuit, indicated generally at 98, for controlling operation of the machine. The control circuit components may be mounted on one or more circuit boards themselves mounted on or near the louvered access door(s) (neither depicted) for easy access and cooling. The control circuit 98 is adjustable, preferably by being designed around an adjustable, in particular, reprogrammable computer means, indicated generally at 100. The computer means 100 preferably is a microcomputer which includes a microprocessor 110 running an operating program, dedicated temporary storage 111, dedicated timers 112, and various I/O ports, buffers, etc. (not depicted) of ordinary and known construction which permit interaction between the computer means 100 with other elements of the control circuit 98 and the controlled electrical and electromechanical elements of the machine. Directly associated with the microcomputer 100 and forming part of the control circuit 98 are a key pad 102 and a separate EEProm 104. The key pad 102 provides operator interface and data entry capability permitting reprogramming of the computer in a manner to be described to adjust machine operation. The EEProm stores the reprogrammed changes made to the computer when the machine is turned off permitting their reuse, also in a manner to be described. The key pad 102 preferably has eight function keys 106 and a vacuum fluorescent six-character display 108 on which values and messages may be scrolled. Four of the function keys 106 preferably are provided for use by the machine operator and control starting and stopping of the machine, operation of the various machine lights like light 88 and the cabinet hot air heater 120, and enablement of the feeding of the salt and the feeding and heating of the oil for seasoning. A fifth key is provided to clear messages in the display 108. The three remaining keys are dedicated to servicing and adjusting the machine including incremental digital adjustment over continuous ranges of certain predetermined parameters which are used to control the operation of the machine. These also will be subsequently discussed.

The microprocessor 110 controls the supply of power to the electric eye light source 126 and receives a control signal generated by a photocell of the electric eye light sensor 128. The microprocessor 110 further powers the popping chamber temperature sensor 84 receiving in the process a control signal from that sensor 84 indicating real-time air temperature in the popping chamber 17. Other devices operated through enabling or disabling signals generated by the microprocessor 110 include the damper motor 28, the resistance wire cycle heater 32, each of the cartridge heaters 33 through 37, the feed conveyor drive motor 58, the oil supply solenoid 62 and oil supply heater 64, salt supply motor 72, cabinet cooling fan 86, cabinet light(s) 88, discharge solenoid 94, a motor 118 for rotating spider 81 and the blower 122 and heating element 124 of the cabinet warmer 120. Also associated with the control circuit means 98 but omitted from FIG. 5 are various relays, contacts and switches which may be positioned between the computer means 100 and the various electrical and electromechanical devices controlled by the control circuit 98. The identification and use of these devices would be known to those of ordinary skill and reference is further made to the circuitry of U.S. Pat. No. 4,438,682 for examples.

Preferably, certain additional safety features are provided including a fixed-temperature thermostatic switch 66 controlling the supply of electricity from the microprocessor 110 to the oil reservoir heater 64 for control of the oil temperature and a high temperature limit thermostatic switch 130. The latter is preferably provided in the heating chamber 31 to sense temperature therein and to automatically switch off power to the heater elements 32 through 37 in the event that chamber temperature exceeds a predetermined value to which the thermostatic switch 130 is set. Suggestedly, that switch 130 may be selected or adjusted to open at a temperature of about 550° F. or more. It is further suggested that the main blower motor 23 also be thermally protected by suitable thermally-activated switches (not depicted) to assure both that the motor is not operated at too high an internal temperature or at too high a temperature within the cabinet 8.

Further indicated in FIG. 5 are two manual switches 38 and 39 associated with cartridge heaters 36 and 37, respectively. Either or both of these cartridge heaters 36 and 37 may be turned on through switches 38 and 39 when the machine is installed or adjusted for operation, depending upon the level of popcorn production desired from the machine and the voltage level at which the machine is run. Preferably, at the highest production levels of the machine (about fourteen to sixteen pounds per hour) and at line voltages below 215 V, both switches 38 and 39 are on to enable operation of both of the cartridge heaters 36 and 37. At the lowest production levels (about four to six pounds per hour), neither switch 38 and 39 is on. At the lowest production levels with line voltages below 215 V and at the highest production levels with line voltages above 215 V, only one of the two switches 38 and 39 is on. Further associated with the computer means 100 as part of the control circuit is a service switch 111 which, in one position, permits adjustment of the machine, in particular, reprogramming of various parameters used by the microprocessor to control the operation of the machine, and the bypassing of certain portions of the microprocessor operating program. In its other position, the switch 111 enables automatic operation of the machine by the local operator without permitting reprogramming or parameter adjustment. Lastly, a limit switch 140 is preferably provided to automatically switch off the damper motor 28 when the damper plate 26 reaches the "closed" position.

FIGS. 6A-6I depict a flow diagram for the operating program of the microprocessor 110. The microprocessor 110 cycles through this program at a rate of at least about ten cycles per second. The operating program is further interrupted at a rate of approximately two hundred times per second to update all timers 114 and to respond to certain interrupts. The flow chart of FIGS. 6A-6I is, for the most part, self-explanatory. However, the following comments regarding certain of the steps of the operating program in FIGS. 6A-6I may be helpful in fully understanding operation of the machine.

After the computer means 100 is powered up at 202 by plugging in the machine or turning on a main power switch, if one is provided, the microprocessor automatically starts to run the program at step 204. The main power line is observed for transient values at 206 and after settling to a steady level, the program proceeds to initialize itself, the microprocessor 110, temporary storage 111 and the timers 114. As part of the initialization process, data from predetermined locations in the EEProm 104 are loaded into the temporary storage 112 of the computer means 100 at step 210. The EEProm 104 stores all of the operating parameters which were incrementally adjusted by the operator in reprogramming the computer to adjust the operation of the machine. At step 212, the operating program examines the data loaded into the temporary storage 112 to determine whether or not it is valid and, if it is valid, proceeds to step 216. If the information is not valid, the operating program enters default preset values for each of the parameters from the program itself in the temporary storage. Next, the program initializes the dedicated timers 114 which are provided for timing the occurrence of various events during each popping cycle. Steps 222, 224, 226 and 232 are directed to running user messages which are displayed each time the machine is powered up. In a service mode which is controlled by the position of the service switch 110 (FIG. 5), these messages are avoided by step 226. After bypassing or displaying of the service messages, the microprocessor passes through the run popping sequence 230 which is discussed in further detail with respect to FIGS. 7A and 7B. The preferred run popping sequence is an approximately fifteen- to twenty-minute cycle during which the machine is preheated, popcorn is popped, the machine is shut down and unpopped kernels are discarded. Steps 236, 238 and 240 cause the popping chamber to be initially preheated to a temperature preferably approximately fifteen degrees below a predetermined maximum temperature to be tolerated in the popping chamber, also sometimes hereinafter called an alarm set point temperature, above which the operating program will shut down the machine. As will be discussed with respect to FIGS. 7A and 7B, the popping sequence followed by the microprocessor 100 at step 230 is time driven and the sequence is suspended indefinitely until the popping chamber 16 has been initially preheated. This causes the fluctuation in the actual length of the machine popping cycle. The operating program popping cycle is predetermined and effectively ignores the time spent in initially preheating the machine.

Steps 242, 244, 246 and 248 control the intermittent on and off operation of the resistance wire cycle heater 32 to maintain popping chamber temperature about a predetermined cycle temperature ("cycle heater set point" temperature), preferably to within about ±1° of 395° F. Real-time popping chamber air temperature can be displayed on the display device 108 while the machine operates through the use of the service switch 111 and the SELECT function key 106. Steps 250 and 252 control the setting of a stop flag if the popping chamber temperature rises too high, for example, above about 455° F. Steps 254 and 256 control disablement of the feed conveyor drive motor 58 when popping chamber temperature drops too low, for example, below about 380° F. Step 260 is accomplished by storing and updating the amount of time the feed conveyor drive motor 58 is operated. A flag is set by step 262 to display a message to the operator to refill the machine reservoirs each time approximately twenty pounds of corn has been popped.

Step 264 determines when the active heating portion of the popping cycle has been completed, for example, by consulting one of the dedicated timers 114, which times the elapsed time of the operating program popping cycle. At the end of the aotive heating portion of each popping cycle, the control circuit runs through a shutdown cycle. The shutdown cycle is entered at step 264 and, through step 268, at any time a stop flag has been set for any reason. At the end of the active heating portion of the popping cycle, the cartridge heaters 33 through 37 are turned off and an adjustable damper close delay timer, one of the dedicated timers 114, is started. When the damper close delay timer times out, step 280 activates the damper motor 28 to begin closing of the damper. The damper motor operation ceases automatically through the action of the damper limit switch 140 (FIG. 5). At the end of the shutdown cycle, determined in step 284, the main blower motor 23 is turned off and the reject solenoid 94 deactivated, permitting the reject flapper door 92 to fall open and drop any remaining, unpopped kernels. After a short period, approximately thirty seconds, which is determined in step 288, the operating program determines whether a stop flag has been set (step 290). If one has not been set, the program resets the elapse-time timer, clears the displays and prepares for a restart of the next popping cycle. If the stop flag has been set, the run flags and stop flags are both cleared (steps 294 and 296).

In steps 298, 302 and 306, the program determines whether the "STOP", "LIGHTS" or "SEASONING" function keys 106 on the key pad 102 has been actuated, and, if so, the stop flag is set 300 or the lights and seasoning output lines toggled on or off from their existing respective conditions. In particular, steps 302 and 304 preferably permit at least the various lights 88, the cabinet warmer 120 and any other elements desired to be operated or powered to be operated or powered, even while the machine is not actively running a popping sequence.

The service portion of the operating program is entered through step 310. In this step the microprocessor 110 examines the state of the service switch 110 (FIG. 5). Even-numbered steps 312 through 334 permit the display and incremental adjustment of various predetermined parameters of the popping sequence run by the machine as well as the display of still other parameters of the machine itself. Even-numbered steps 336 through 350 are provided for shutting down the machine when excessive temperatures are sensed in the upper portion of the cabinet 8 (steps 336, 338 and 340) or the popping chamber itself (steps 342 and 344) or when there is an indication from the photosensor 128 that the lower open end of the popping jar 11 might be clogged with popped corn (steps 346, 348 and 350). Even-numbered steps 354 through 360 control the display of various operator messages in the display 108. These operator messages may identify the current state of the machine or the operating program, for example, initial warm-up, normal popping cycle, normal shut down (following a complete popping cycle), other shut down (because the stop button was pressed or an errant condition was sensed), etc. Initial messages which might be provided for display with each machine start up could be used to remind the operator to clean the machine, fill the oil, salt and corn reservoirs, and to service any other components which require regular maintenance.

Once the operating program enters the service sequence from step 310, the key pad 102 and certain of its function keys 106 are used to display certain parameters of the popping sequence and machine operation and to incrementally vary a subset of those parameters for which such variations are permitted. Depressing a "SELECT" function key 106 repeatedly during the service mode causes a series of parameter names and parameter values to be sequentially displayed. Preferably, fourteen parameters are determined by the computer means 100 and sequentially displayed: the version number of the stored operating program software; the elapsed time in the current popping cycle; the real-time air temperature in the popping chamber; the total weight of corn popped by the machine; the on-time for the feed conveyor motor during an initial corn feed subcycle of each approximately fifteen- to twenty-minute popping sequence or cycle for controlling the amount of corn initially charged into the popping chamber; the on-time for the feed conveyor motor during each subsequent corn feed subcycle of each popping cycle for controlling the amount of corn incrementally fed in each subsequent corn feed subcycle; the off-time for the corn feed motor between each on-time period for controlling the length of each corn-feed subcycle and the duty factor of the feed conveyor during each subcycle; the cyclic feed time for heated oil (oil solenoid on-time) for controlling the amount of oil delivered during the initial and each subsequent corn-feed subcycle; the cyclic feed time for salt (salt motor on-time) for controlling the amount of salt fed during the initial and each subsequent corn feed subcycle; a minimum corn feed temperature in the popping chamber for enabling the feed conveyor; a cycle temperature which is a set point temperature for controlling intermittent operation of the resistance wire cycle heater 32 and popping chamber temperature; a maximum or alarm temperature for controlling automatic stoppage of the machine if that temperature is exceeded in the popping chamber; the damper motor on-time during each popping cycle for operating the damper motor in a "forward" direction at the beginning of the popping cycle to open the arcuate plate for controlling the extent to which the damper is opened and the air flow rate from the blower to the heater; and the delay time after the beginning of a shut-down portion of a popping cycle following which the damper motor is operated in a "reverse" direction to close the damper. Read-outs of the elapsed operating program time and of real-time popping chamber temperature on the display device 108 permit instant and continuous monitoring of the popping cycle and of popping chamber temperature at each moment in the popping cycle.

Preferably each of the controlled motors 28, 58 and 72 is single speed (although at least 28 is also reversible) so that their operation may be controlled simply by varying duty cycles and/or duty factors. Nominal values for each of the incrementably variable parameters might be, for example, a 6.5-second initial corn feed subcycle; 1.00-second subsequent corn feed subcycles; 3.5-second off-time periods between each corn feed subcycle; 0.7-second feed time each for heated oil and salt during each subsequent corn feed subcycle (none with initial feed cycle); a minimum corn feed temperature of about 380° F.; a cycle temperature of about 395° F.; a maximum or alarm temperature of about 455° F.; an eighteen-second initial on-time for damper motor operation to open the damper; and a seven-second delay after the shut-down mode portion of a popping cycle is entered for damper motor closure operation. These ten parameters are continuously variable over continuous ranges by digital incrementation up or down through "INCREASE" and "DECREASE" function keys 106 provided on the key pad 102, from the preset values incorporated into the operating program. Each of the temperature values is continuously variable in one degree increments about the indicated nominal values. Time values are continuously variable around the indicated nominal values in 0.1-second increments, except for subsequent corn-feed cycles, which is continuously incrementable in 0.01-second increments, and damper close delay which is continuously incrementable in one-second increments. Each of these ten parameters is independently variable. Each may be digitally incremented independently of any variations which may be made to any of the nine other adjustable parameters. Thus, for example, the amount of corn transported during a predetermined period of time can be incrementally varied independently of any variation to the damper motor on-time for determining the opening of the arcuate damper plate. The same is true as to the cycle set point temperature, the maximum or alarm temperature, the feed temperature permitting enablement of the feed conveyor motor, the amount of oil and salt fed, and the time when the damper begins to close at the end of each popping cycle. This capability permits each machine to be custom configured to a desired production rate, suggestably between about four and sixteen pounds of popped corn per hour in continuous operation, while accounting for any irregularity in the various components, particularly the popping chamber, and in actual nominal line voltage in the area where the machine is installed, so as to operate optimally at the selected production rate. Moreover, configuring the machine to perform these changes through the operating program permits easy, rapid and accurate adjustment of the machine through the function keys 106 for optimal performance at any desired output. As a result of this reprogramming capability it has been found possible to adjust machines for operation with only three percent (3%) wastage. This is nearly a two-third reduction in wastage over the best figures achieved with the prior art machines based upon the design of U.S. Pat. No. No. 4,438,682.

Figure 6A:
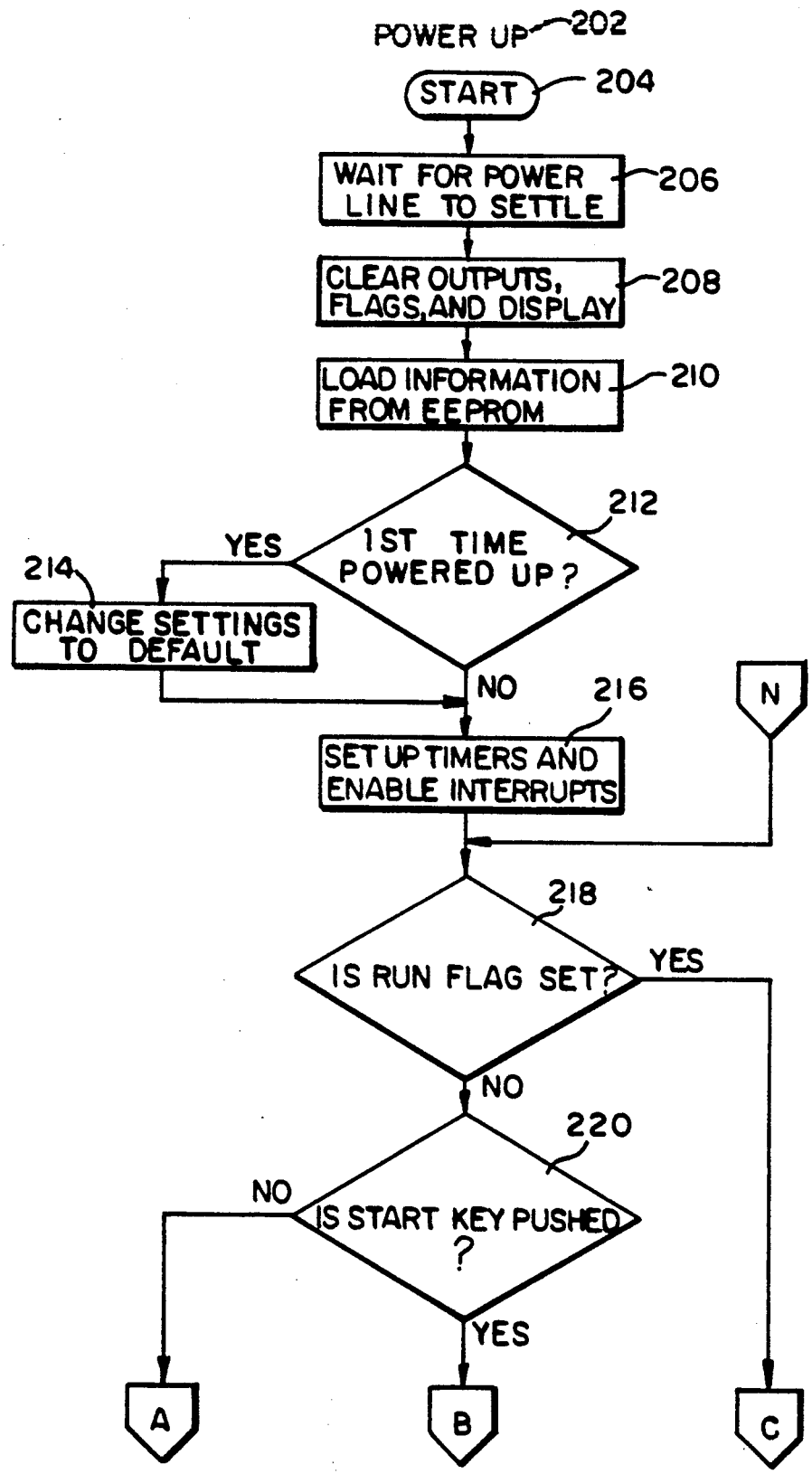
FIGS. 6A-6I are a flow diagram of the main operating program of the microprocessor of the control circuit of FIG. 5 for controlling the operation of the machine.
Figure 6B:
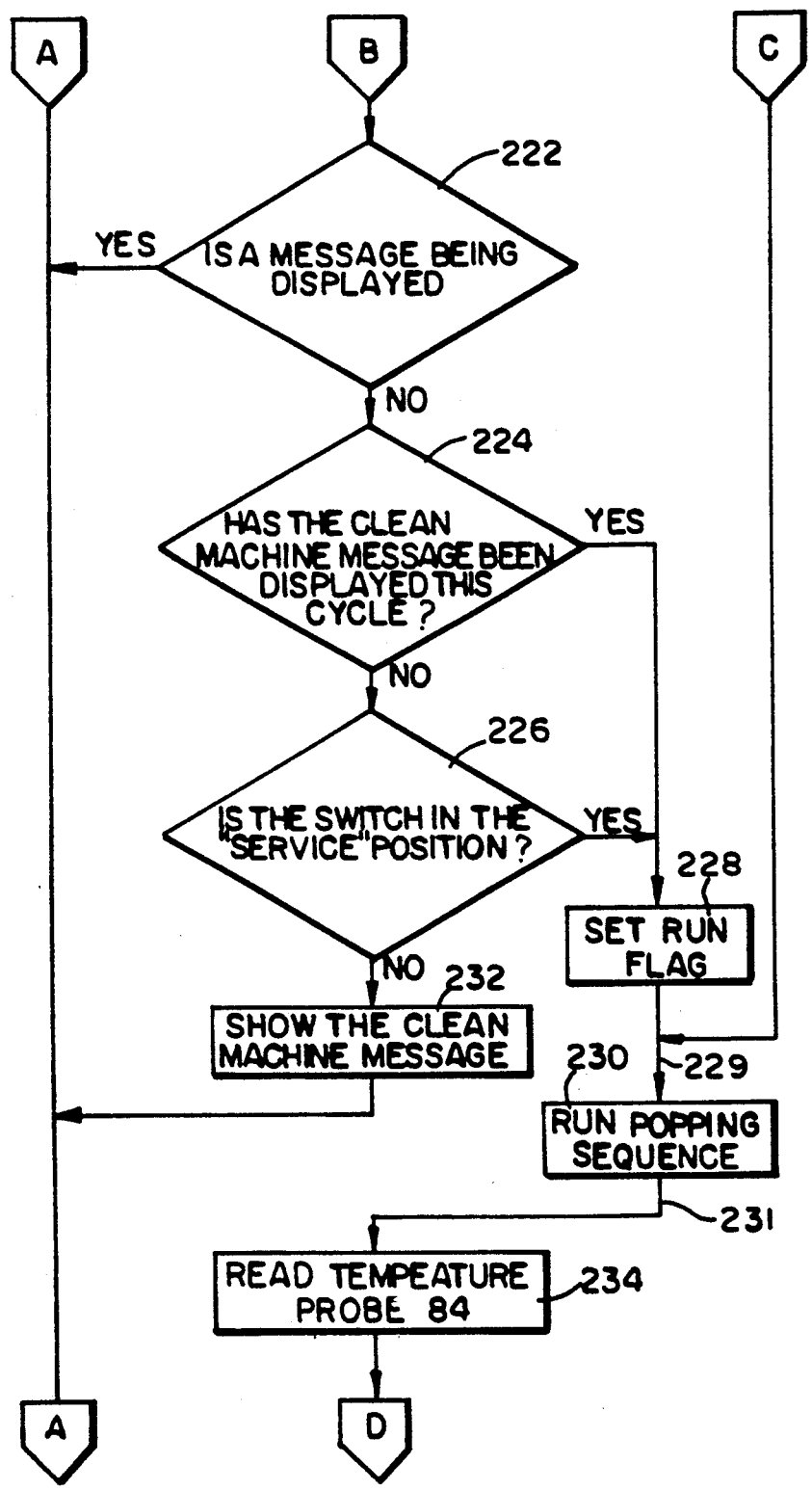
Figure 6C:
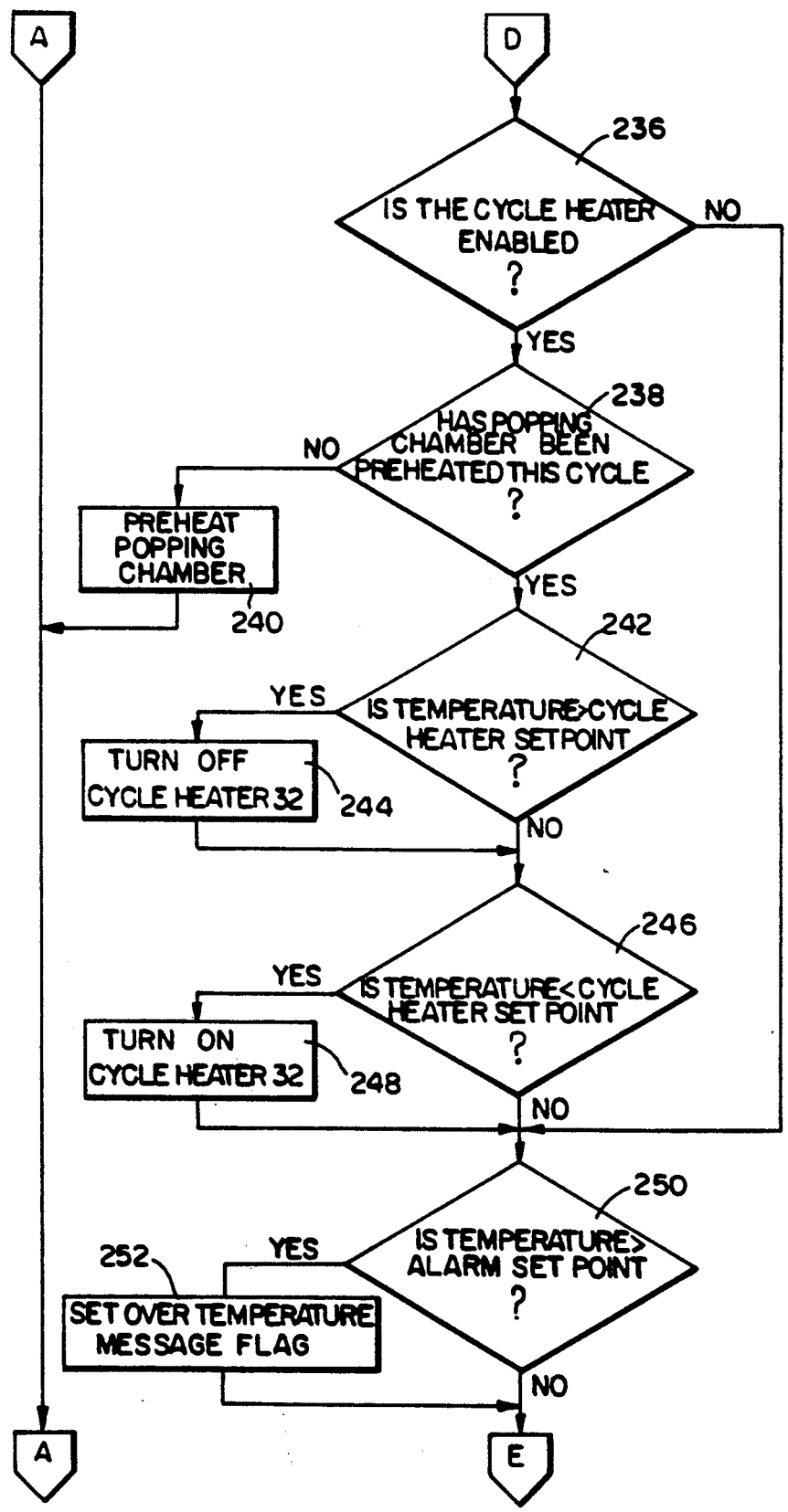
Figure 6D:
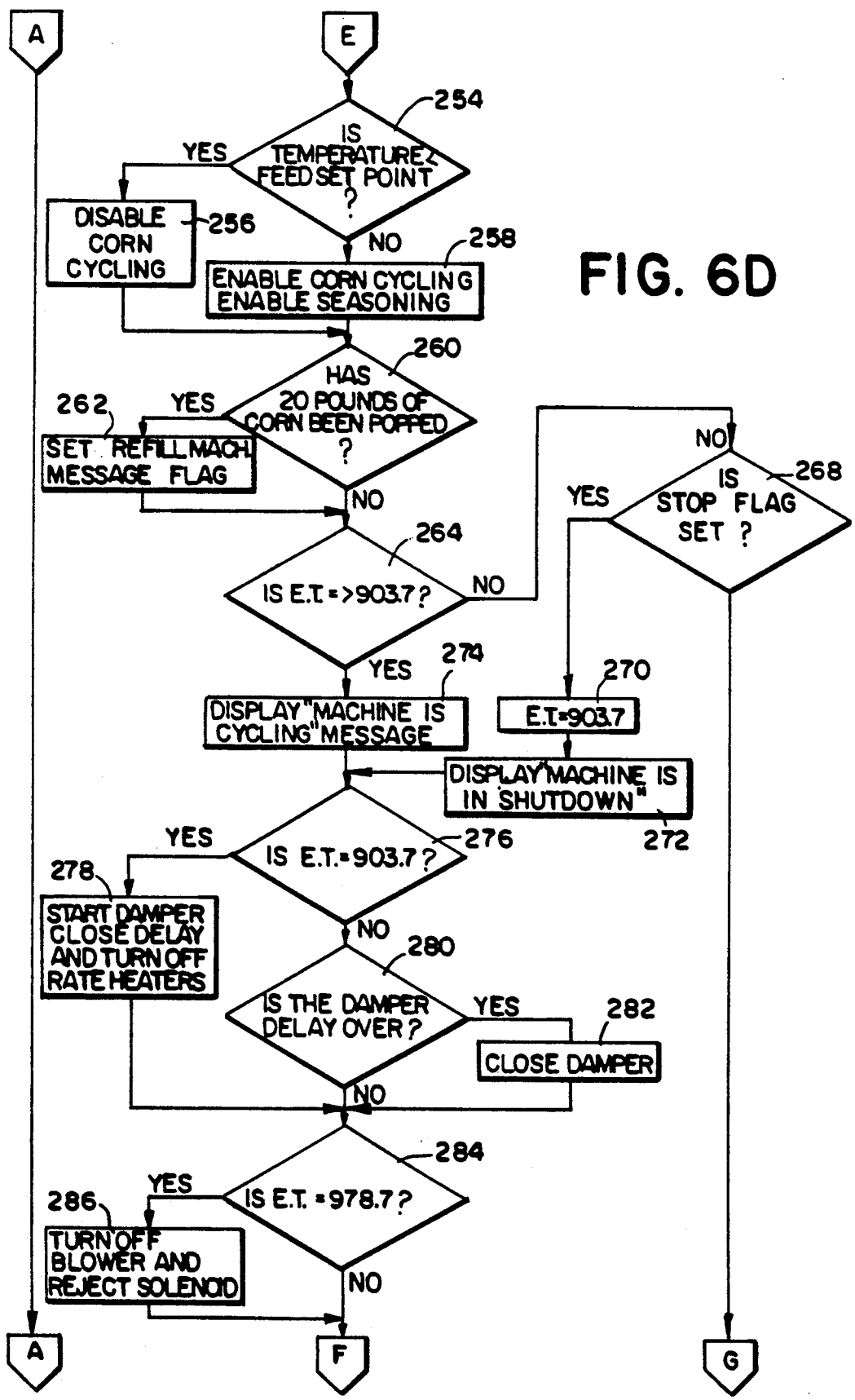
Figure 6E:
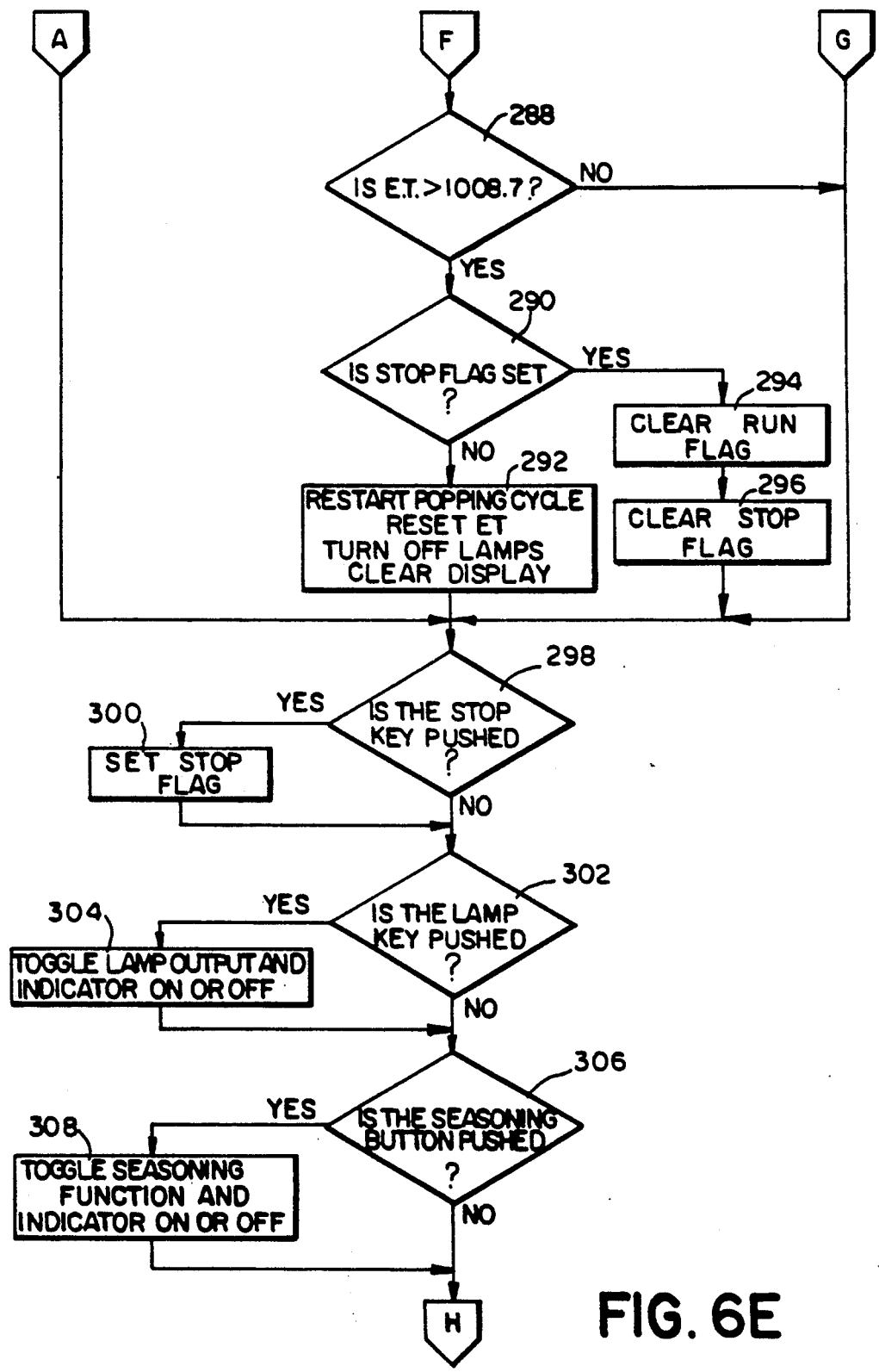
Figure 6F:
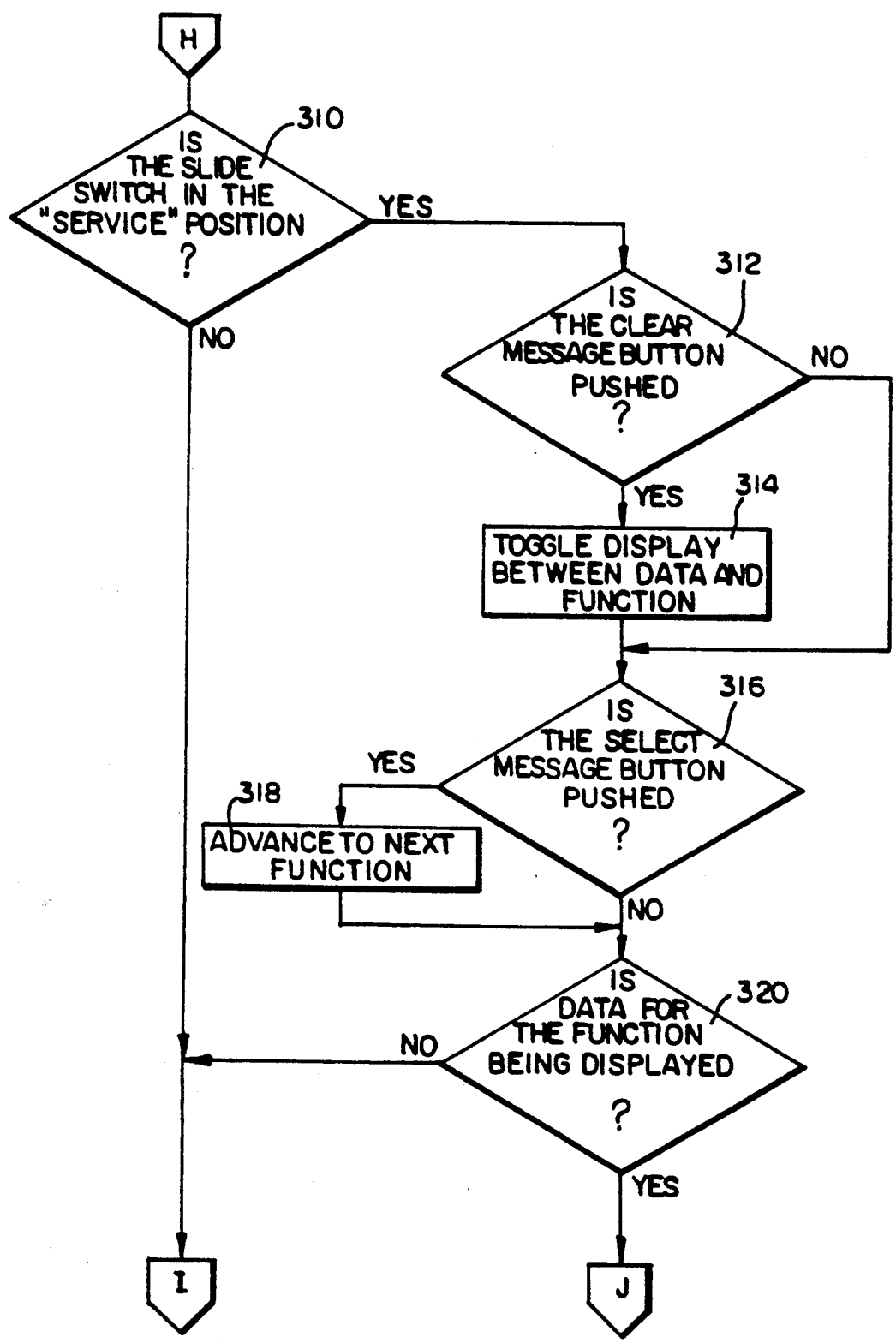
Figure 6G:
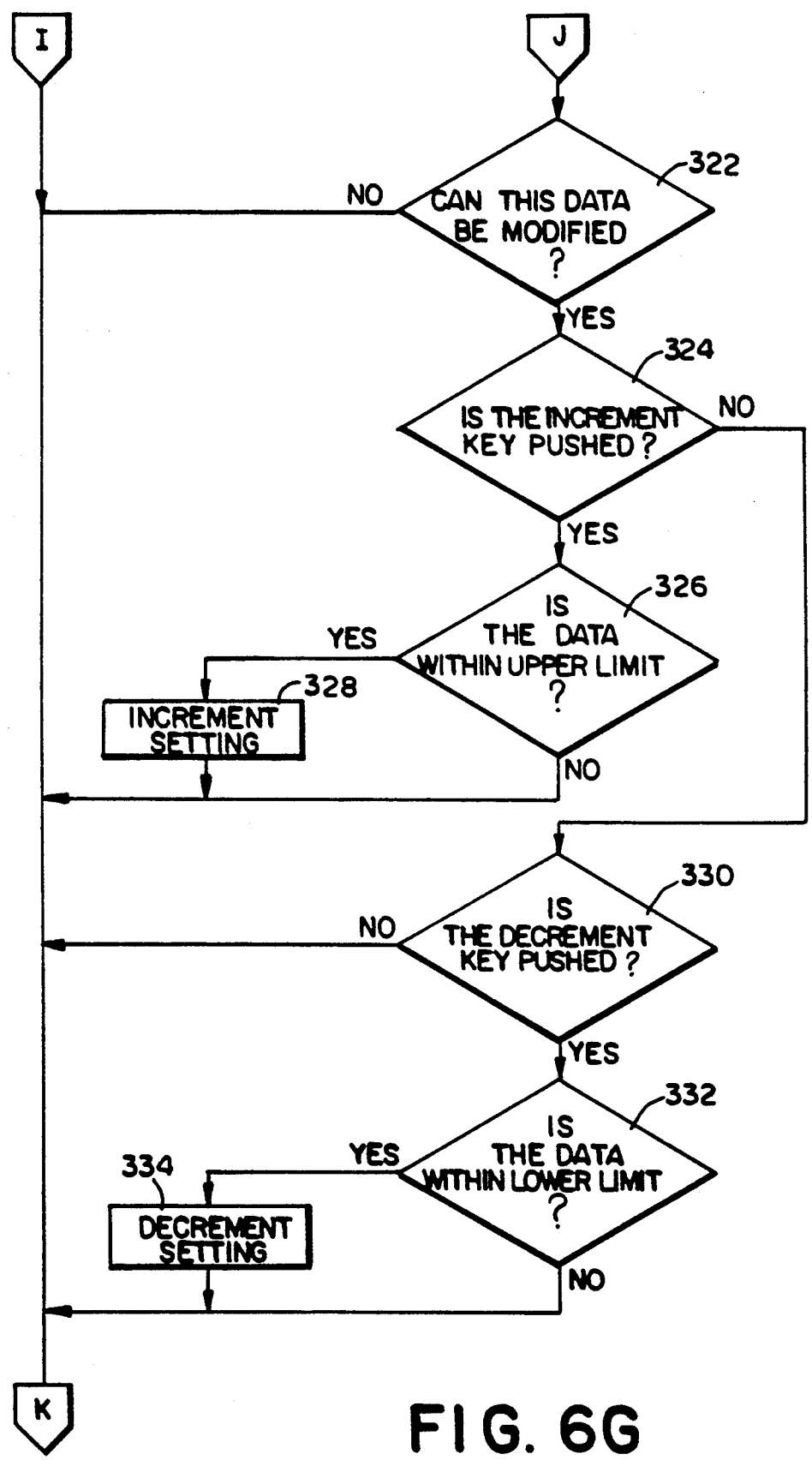
Figure 6H:
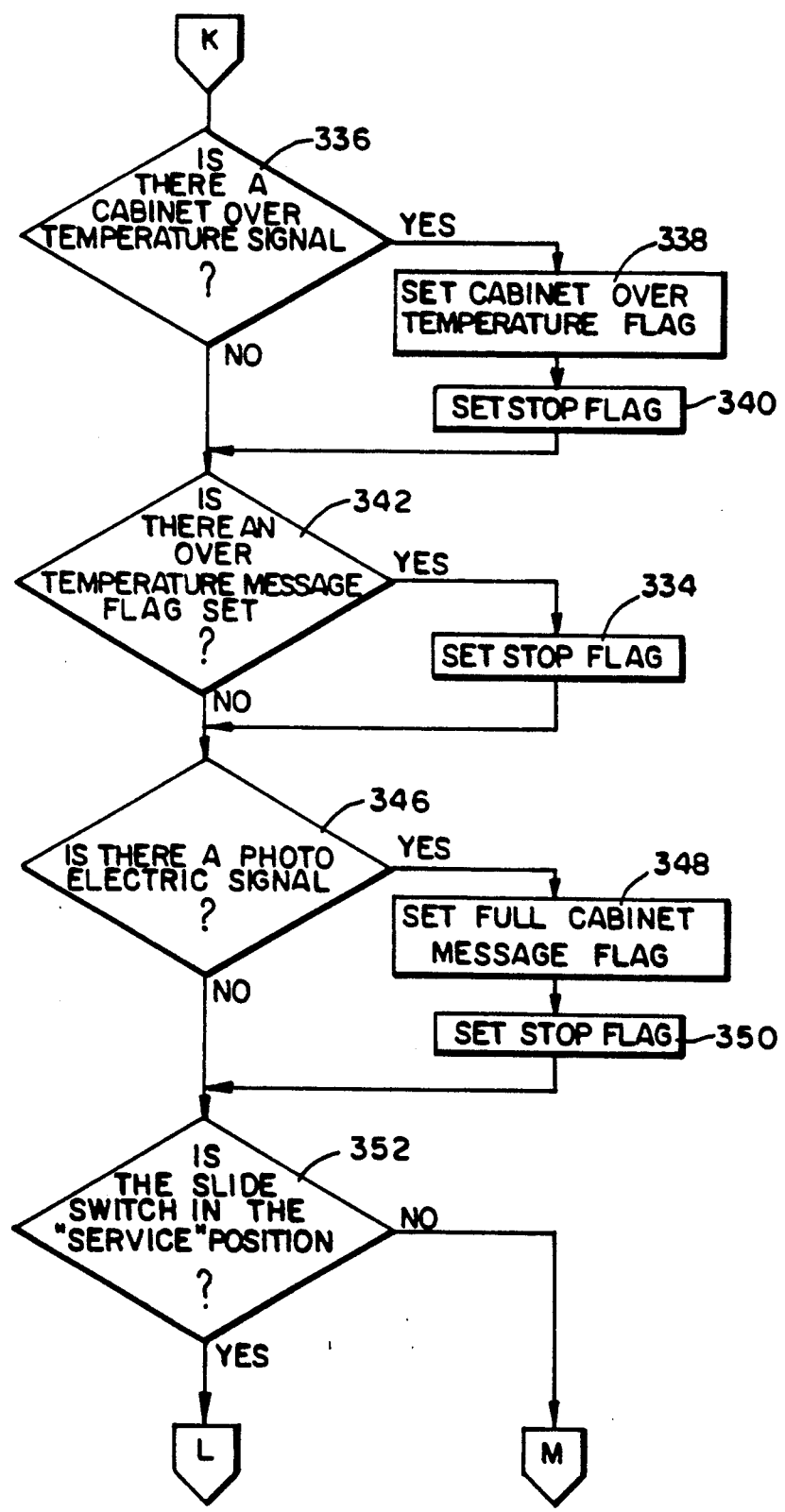
Figure 6:
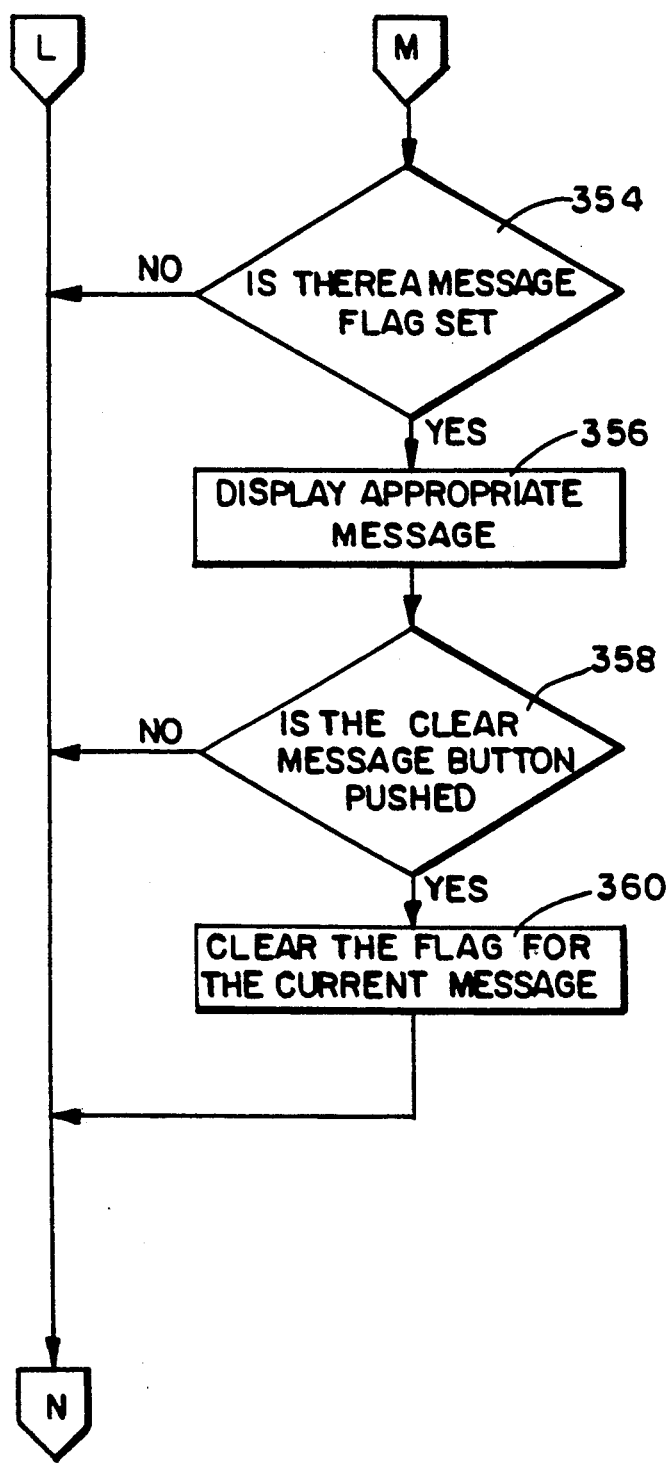
Figure 7A:
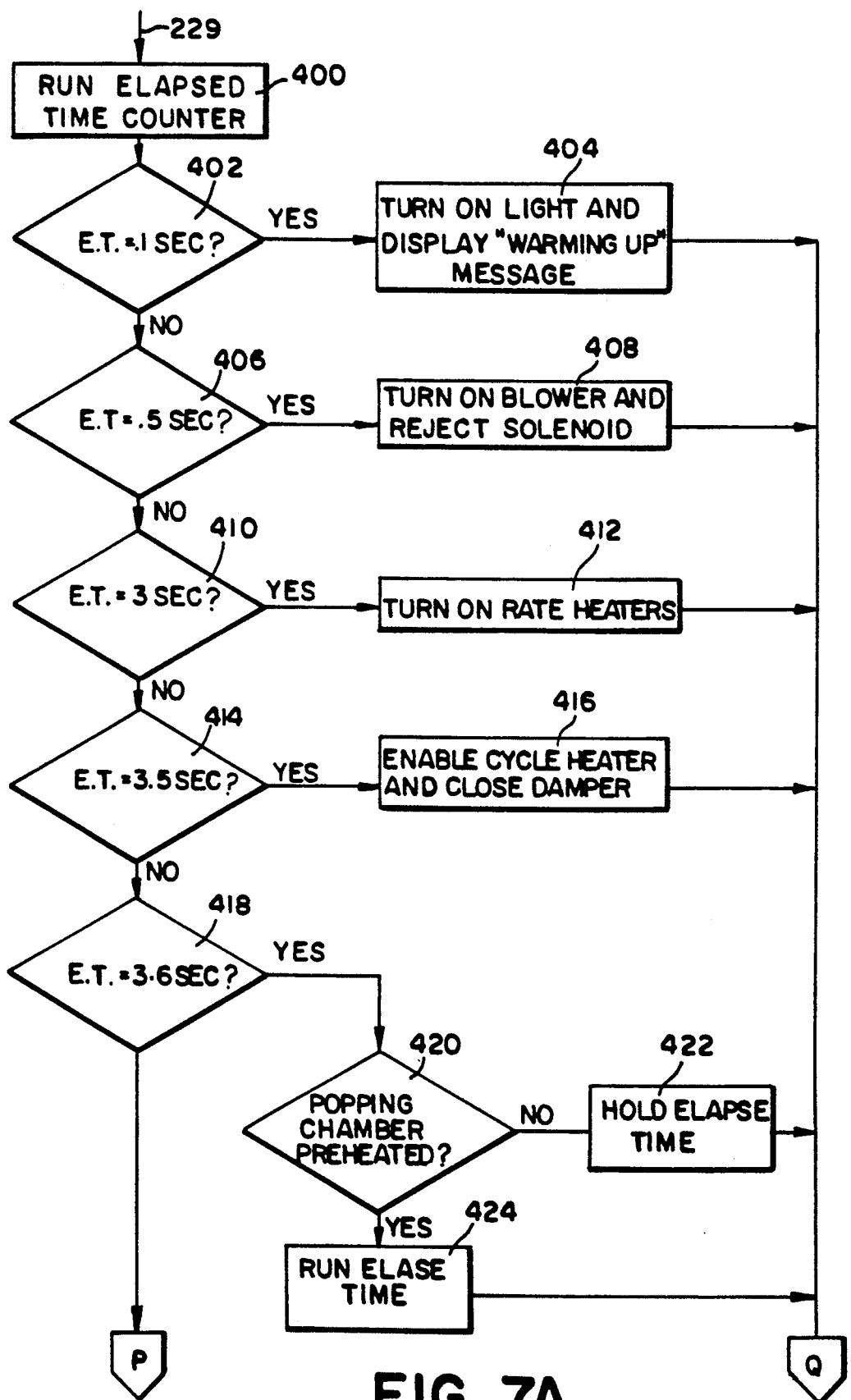
FIGS. 7A-7B are a flow diagram of the run popping sequence portion of the operating program diagramed in FIG. 6B.
Figure 7B:
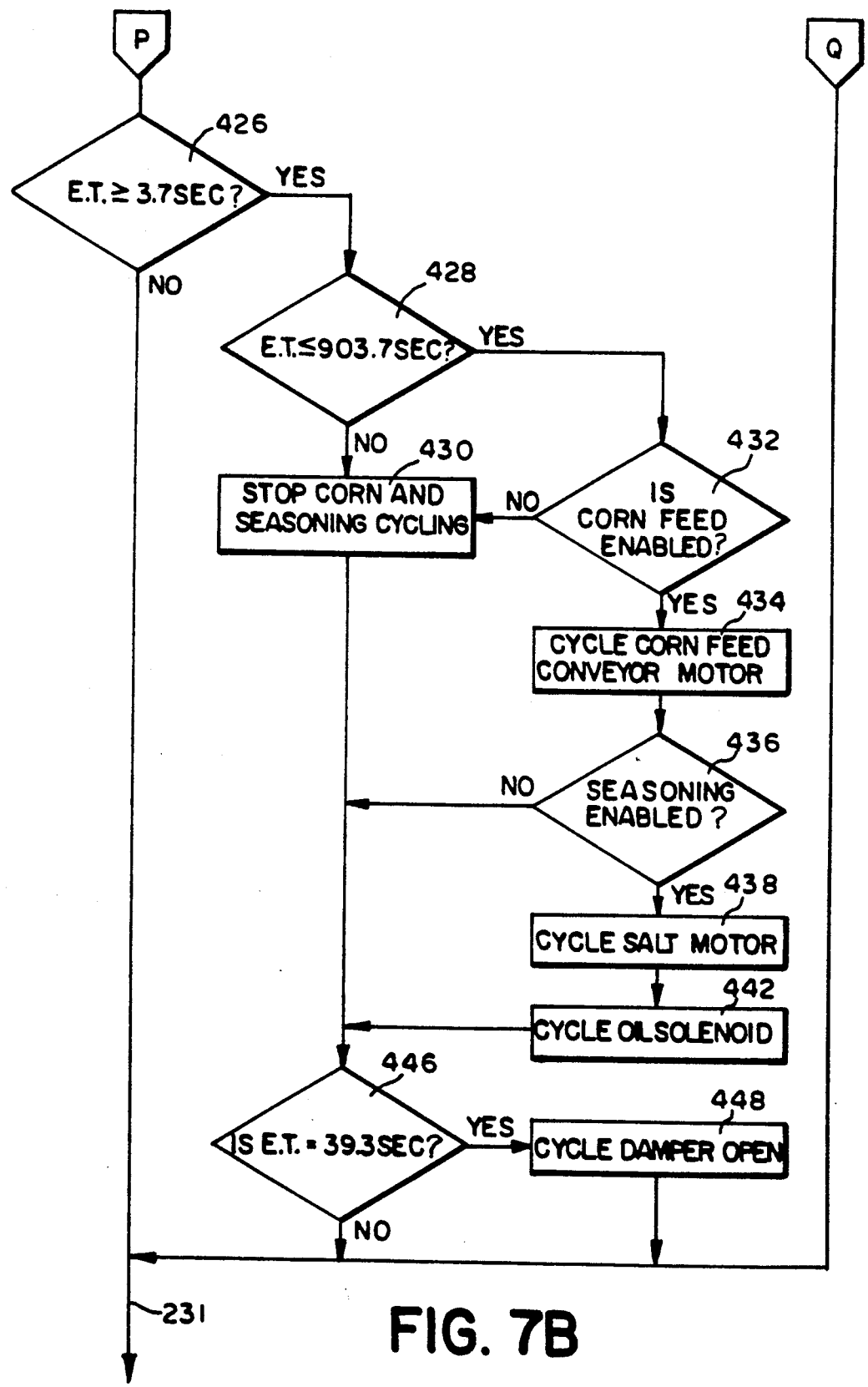

FIGS. 7A and 7B are halves of a flow chart covering major steps of the operating program followed in the run popping sequence 230 of the operating program (see FIG. 6B). The microprocessor 100 operates the run popping sequence 230 in conjunction with a dedicated elapsed time timer which is one of the timers 114. During the first pass through the run popping sequence 230 (elapse timer at 0.1 second), the machine turns on the lamps 88 and displays a "WARMING UP" message in step 404. After approximately four more loops through the operating program, the elapsed time timer has been updated to 0.5 seconds, at which time the main blower 20 and reject solenoid 94 are powered (steps 406 and 408). At 3.0 seconds into the popping cycle (step 410) the microprocessor turns on cartridge heaters 33–37. At 3.5 seconds into the popping cycle (step 414), the microprocessor turns on the cycle heater 32 and operates damper motor 28 in a reverse direction to initialize the damper in the "CLOSED" position (step 416). At 3.6 seconds (step 418), the microprocessor determines whether the popping chamber has been preheated to the minimum chamber temperature, for example, about 380° F. (step 420). If that temperature has not yet been reached, the program prevents the elapsed time timer from being incremented (step 422). Once the chamber has reached the minimum temperature for corn feeding, incrementing of the elapsed time timer is resumed (step 424). Between 3.7 and 903.7 seconds, whenever the temperature conditions are appropriate for feeding corn into the popping chamber (i.e. popping chamber temperatures above the predetermined required feed temperature and below the alarm temperature) during an initial or subsequent corn feed period of each corn feed subcycle (all at 430), the corn feed motor 58 is cycled (step 432). Otherwise, corn feed motor cycling is halted (step 434). If the feed conveyor is enabled for a subsequent corn feed subcycle, the program further checks to determine if SEASONING is enabled, both by the state of the seasoning function key 106 on the key pad 102 and whether the salt and oil feed enabling timers, which regulate the incrementally variable salt feed and oil feed periods during each corn feed subcycle, are on (all in step 436). If not, the salt motor 72 is disabled (step 430). If the salt and oil feed operations are enabled by the function key and timer states, the salt feed motor and oil feed solenoid 62 are cycled (steps 438 and 442). At 39.3 seconds into the elapse time of each popping cycle, the damper motor 28 is turned on for the predetermined time preset by the operating program or incrementally varied during setup or subsequent servicing of the machine, to open the damper during the popping cycle and set the air flow rate to the blower.

Figure 8:
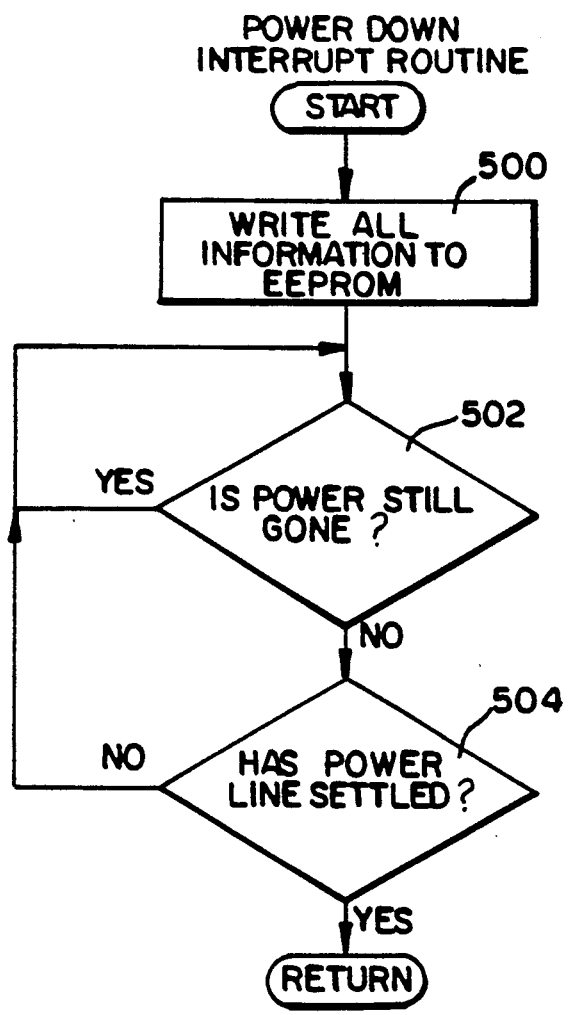
FIG. 8 is a flow diagram for a power down interrupt cycle of the operating program of the microprocessor.

FIG. 8 is a flow diagram of power-down interrupt subroutine which the main operating program enters when the microprocessor 100 senses a falling voltage in the main power line. The operating program reloads the adjustable parameter values from the dedicated temporary storage associated 112 with the microprocessor 100 into the EEProm 104 (step 500) to save that information for future use.

OPERATION

The preferred machine is configured to operate in repeated, sequential popping cycles, each between about sixteen to twenty minutes long. If corn were fed through the feed conveyor 50 at a maximum rate for each cycle, approximately sixteen to eighteen pounds of corn would be popped per hour. In addition, the microprocessor 110 is preferably programmed to repeat its operating program at a rate of at least about ten cycles per second, and to interrupt the operating program at a rate of about two-hundred cycles per second to at least increment timers.

Preferably, each machine is initially operated after assembly using a predetermined, known line voltage source, to determine specific incrementally-variable parameters for the particular machine to pop corn optimally at one or more predetermined rates, for example, at a high or the highest possible and/or at a low or the lowest possible rate. With these benchmark variable parameter values, the machine can then be installed in any area and adjusted to compensate for differences between local line voltage and the predetermined voltage or to vary the production rate of the machine. It typically will be necessary to adjust the state of heater switches 38 and 39 and to vary the corn feed off-time between corn feed subcycles, the duration of the initial corn pulse (initial amount of corn transported in the first corn feed subcycle), the damper open position (damper motor on-time), and the damper delay period (when the damper begins to close during shutdown at the end of each popping cycle).

The machine may be initially calibrated and subsequently adjusted in the field by running the machine to pop corn using the preset values for the incrementally-variable parameters, which are encoded into the operating program, adjusting the computer means through use of the service switch 110 and service function keys 106 of the key pad 102 to incrementally vary one or more of the variable parameters, for example, varying one of the amount of corn transported during an initial feed subcycle or subsequent feed subcycle and the air flow rate (through adjustment of the damper motor on-time) independently of the other parameter and each other variable parameter, and then operating the machine with the adjusted computer means 100 to pop corn and to observe the results of the adjustment. Parameter variation through the computer means 100 via the key pad 102 permits immediate, convenient and accurate adjustment of control circuit 9 while the machine is operating, something that was impossible or at least difficult and dangerous to do with previous machines, to the extent such machines permitted any adjustment. Once the microcomputer 100 is adjusted, the service switch 111 is returned to an operation state. The machine operates automatically thereafter without further adjustment. The adjusted parameters will be sorted in the EEProm by the operating program each time the machine shuts down and retrieved and reused each time the machine is again powered up. To subsequently operate the machine, the operator supplies power to the machine by plugging the machine in or turning on a power switch, if provided. The microprocessor begins running the operating program. By depressing the LIGHTS function key 106, the operator can illuminate the lights, start the cabinet warmer, etc. The described machine automatically displays the first of several service reminder messages in the key pad display 108. The operator must cycle through each of the service messages with the CLEAR function switch 106 before the machine will operate to pop corn. If the corn is to be seasoned, the SEASON function key must also be depressed. The machine will thereafter cycle through the popping cycle from the beginning of the popping sequence (step 230 of FIG. 6B) through the shutdown (even-numbered steps 264 and 274 through 288 of FIGS. 6D and 6E). If the STOP function key has not been depressed and if no conditions have occurred which would cause a STOP flag to be set for the machine to shut down (e.g., temperatures exceeding the maximum or alarm temperature in the popping chamber, light sensor 128 signal indicating lower portion 9 of the cabinet 8 full of popped corn, etc.), the computer means 100 will commence another popping cycle after a short delay.

One of ordinary skill will appreciate that the amount of corn fed by the feed conveyor means during a predetermined period of time depends both on the length of the predetermined period, which is considered to be the total length of time of the initial corn-feed cycle on the total length of time of each subsequent corn-feed cycle, and the duty factor of the conveyor during each corn-feed cycle. Both the total length of time of each corn-feed cycle and the duty factor of each corn-feed cycle can be adjusted, although the off-duty period must be the same for each.

The importance of the ability of the machine to sense, determine and display popping chamber temperature cannot be overemphasized. Not only does it permit accurate temperature adjustment, it permits monitoring of the popping chamber temperature during the entire popping cycle. Thus, for example, the effects of each corn-feed cycle on popping chamber temperatures can be observed easily and conveniently and the duration of the corn-feed cycle and duty factor of the conveyor motor adjusted easily and conveniently for optimal machine performance.

The present invention may be embodied in another specific form without departing from the spirit or essential attributes thereof. Accordingly, reference should be made to the appended claims, rather than to the foregoing specification, as indicating the scope of the invention.

We claim:

1. A corn popping machine comprising:
    a reservoir for unpopped corn;
    a popping tube forming at least part of a popping chamber;
    feed conveyor means for transporting unpopped corn from the reservoir to the popping chamber;
    heater means for heating air;
    air-flow conveying means coupling the heater means and the popping chamber for moving air at a variable flow rate through the heater means to the popping chamber; and
    control circuit means for controlling operation of at least the feed conveyor means and the air-flow conveying means, the control circuit means being adjustable for varying an amount of corn transported by the feed conveyor means during a predetermined period of time and for varying flow rate of the air delivered to the heater means independently of one another.

2. The machine of claim 1 wherein the control circuit means comprises reprogrammable computer means for controlling and independently varying the amount of corn transported by the feed conveyor means and the flow rate of air to the heater means.

3. The machine of claim 2 further comprising sensor means in the popping chamber for sensing temperature of air therein and wherein the computer means is adapted to operate the feed conveyor means only after the sensor means senses an air temperature at least as high as a predetermined feed temperature and wherein the computer means is further adjustable for incrementally varying the predetermined feed temperature independently of any variation to the amount of corn fed and of the flow rate of air to the heater means.

4. The machine of claim 3 wherein the control circuit means comprises a display means coupled with the computer means and wherein the computer means is adapted for displaying real-time popping chamber air temperature through the display means.

5. The machine of claim 2 wherein the control circuit means further comprises data entry means coupled with the computer means for reprogramming the computer means to vary at least one of the predetermined amount of corn transported and the flow rate of air to the heater means.

6. The machine of claim 5 wherein the control circuit means further comprises data storage means for storing reprogramming changes to the computer means for repeated use.

7. The machine of claim 2 wherein the feed conveyor means transports corn at a predetermined uniform rate in continuous operation and wherein the computer means is adapted for varying length of successive corn-feed cycles of the feed conveyor means and for varying a duty factor of the feed conveyor means over the corn-feed cycles to vary the amount of corn transported by the feed conveyor means over a predetermined period of time equal to the length of each of the corn-feed cycles.

8. The machine of claim 2 wherein the airflow conveying means comprises adjustable damper means for varying the rate of air flow to the heater means, wherein the control circuit means is adapted for controlling adjustment of the damper means and wherein the computer means is adapted for incrementally adjusting the damper means.

9. The machine of claim 8 wherein the computer means is adapted to open and then close the damper once during a corn-popping cycle and wherein the computer means is further adapted for incrementally varying the time the damper remains open during the popping cycle.

10. The machine of claim 8 wherein the damper means includes a movable plate and a damper motor coupled with the plate and wherein the computer means is adapted to controllably vary the time the damper motor operates to move the damper plate.

11. The machine of claim 1 further comprising a popping jar receiving at least one end of the popping tube and photosensor means positioned below an open bottom end of the jar for generating a signal indicating when the open bottom end is free of standing, popped corn and wherein the control circuit means is responsive to the photosensor means signal for enabling operation of the feed conveyor means only when the photosensor means signal indicates the open bottom end of the popping jar is free of standing popping corn.

12. A corn popping machine comprising:
a reservoir for unpopped corn;
a popping tube forming at least part of a popping chamber;
feed conveyor means for transporting unpopped corn from the reservoir to the popping chamber;
heater means for heating air;
air-flow conveying means coupling the heater means and the popping chamber for moving air through the heater means to the popping chamber;
sensor means in the popping chamber for sensing temperature of air therein;
display means for displaying temperature; and
control circuit means for controlling at least one operation of the machine and for displaying temperature of the popping chamber sensed by the sensor means on the display means.

13. The machine of claim 12 wherein the control circuit means is further responsive to the sensor means for controlling operation of the heater means to maintain the popping chamber at a predetermined set point temperature.

14. The machine of claim 13 wherein the control circuit means is adjustable for adjusting the set point temperature of the popping chamber.

15. The machine of claim 14 wherein the circuit means comprises computer means responsive to the sensor means for controlling operation of the heater means and data entry means coupled with the computer means for adjusting the set point temperature of the popping chamber through the computer means.

16. A corn popping machine comprising:
a reservoir for unpopped corn;
a popping tube forming at least part of a popping chamber:
feed conveyor means for transporting unpopped corn from the reservoir to the popping chamber;
heater means for heating air;
air-flow conveying means coupling the heater means and the popping chamber for moving air through the heater means to the popping chamber;
sensor means in the popping chamber for sensing temperature of air therein; and
programmable computer means with an operating program for at least partially controlling corn popping operation of the machine.

17. The machine of claim 16 further comprising data entry means coupled with the computer means for reprogramming the computer means and adjusting operation of the machine.

18. The machine of claim 16 further comprising display means coupled with the computer means for displaying during a corn popping operation of the machine a parameter of the machine varying over the corn popping operation.

19. A corn popping machine comprising:
a reservoir for unpopped corn;
a popping tube forming at least part of a popping chamber;
feed conveyor means for transporting unpopped corn from the reservoir to the popping chamber;
heater means for heating air;
a storage area adapted to receive popped corn from the popping chamber;
air-flow conveying means coupling the heater means and the popping chamber for moving through the heater means to the popping chamber and for moving popped corn from the popping chamber to the storage area and;
sensor means for sensing when the storage area is filled to a predetermined extent with popped corn.

20. A method of operating a corn popping machine including a reservoir for unpopped corn, a popping tube forming at least part of a popping chamber, a feed conveyor for transporting unpopped corn from the reservoir to the popping chamber, a heater, an air-flow conveying system coupling the heater and the popping chamber for moving air at a variable flow rate through the heater to the popping chamber, and a control circuit controlling operation of at least the feed conveyor and the air-flow conveying system, the control circuit further being adjustable for varying an amount of corn transported by the feed conveyor during a predetermined period of time and for varying the flow rate of air delivered to the heater independently of one another, comprising the steps of:
operating the machine to pop corn;
adjusting the control circuit to vary one of the amount of corn transported and the flow rate of air delivered to the heater independently of one another; and
operating the machine with the adjusted control circuit to pop corn.

* * * * *